United States Patent
Son et al.

(10) Patent No.: US 12,315,410 B2
(45) Date of Patent: May 27, 2025

(54) WEARABLE DEVICE FOR ADJUSTING SIZE OF EFFECTIVE DISPLAY AREA ACCORDING TO EXTERNAL ILLUMINANCE AND CONTROL METHOD THEREOF

(71) Applicant: Samsung Electronics Co., Ltd., Suwon-si (KR)

(72) Inventors: Dongil Son, Suwon-si (KR); Jongmin Yoon, Suwon-si (KR); Seungnyun Kim, Suwon-si (KR); Seungjoo Lee, Suwon-si (KR); Gisoo Lim, Suwon-si (KR); Kyusik Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 18/466,383

(22) Filed: Sep. 13, 2023

(65) Prior Publication Data

US 2024/0096254 A1   Mar. 21, 2024

Related U.S. Application Data

(63) Continuation of application No. PCT/KR2023/013312, filed on Sep. 6, 2023.

(30) Foreign Application Priority Data

Sep. 21, 2022   (KR) .................. 10-2022-0119560

(51) Int. Cl.
  *G09G 3/20*   (2006.01)
  *G06T 3/40*   (2006.01)

(52) U.S. Cl.
  CPC ............... *G09G 3/20* (2013.01); *G06T 3/40* (2013.01); *G09G 2320/0626* (2013.01); *G09G 2340/04* (2013.01)

(58) Field of Classification Search
  None
  See application file for complete search history.

(56) References Cited

U.S. PATENT DOCUMENTS

| | | |
|---|---|---|
| 2013/0286053 A1 | 10/2013 | Fleck et al. |
| 2017/0229099 A1 | 8/2017 | Mito |

(Continued)

FOREIGN PATENT DOCUMENTS

| | | |
|---|---|---|
| JP | 2014-071230 A | 4/2014 |
| KR | 10-2019-0001983 A | 1/2019 |

(Continued)

OTHER PUBLICATIONS

Lahiru N.S. Wijayasingha et al., A Wearable Sensing Framework for Improving Personal and Oral Hygiene for People with Developmental Disabilities, 2016 IEEE.

(Continued)

*Primary Examiner* — Christopher J Kohlman
(74) *Attorney, Agent, or Firm* — Jefferson IP Law, LLP

(57) ABSTRACT

A wearable device for adjusting the size of an effective display area depending on external illuminance and a control method is provided. The wearable device includes a display module and at least one processor, wherein the at least one processor may be configured to control the display module to output light having a first brightness value from at least one light source of the display module so as to display a virtual object in an effective display area having a first size, determine whether or not surrounding illuminance of the wearable device increases while the light having the first brightness value is output, change, based on the determination that the surrounding illuminance increases, a size of the effective display area displaying the virtual object from the (Continued)

first size to a second size, and control the display module to display the virtual object in the effective display area having the second size.

18 Claims, 11 Drawing Sheets

(56) References Cited

U.S. PATENT DOCUMENTS

| | | |
|---|---|---|
| 2019/0356903 A1 | 11/2019 | Uhm et al. |
| 2020/0111258 A1 | 4/2020 | Sears et al. |
| 2021/0072535 A1 | 3/2021 | Shin et al. |
| 2021/0331564 A1 | 10/2021 | Cho et al. |
| 2023/0215304 A1* | 7/2023 | Nicholson .............. G09G 3/002 345/697 |

FOREIGN PATENT DOCUMENTS

| | | |
|---|---|---|
| KR | 10-2019-0132033 A | 11/2019 |
| KR | 10-2020-0128483 A | 11/2020 |
| KR | 10-2021-0031240 A | 3/2021 |
| KR | 10-2022-0030806 A | 3/2022 |
| WO | 2020/240421 A1 | 12/2020 |
| WO | 2022/132124 A1 | 6/2022 |

OTHER PUBLICATIONS

International Search Report dated Dec. 11, 2023, issued in International Application No. PCT/KR2023/013312.

* cited by examiner

Brightness 50%

Brightness 70%

Brightness 100%

(a)

(b)

(c)

WEARABLE DEVICE FOR ADJUSTING SIZE OF EFFECTIVE DISPLAY AREA ACCORDING TO EXTERNAL ILLUMINANCE AND CONTROL METHOD THEREOF

CROSS-REFERENCE TO RELATED APPLICATION(S)

This application is a continuation application, claiming priority under § 365(c), of an International application No. PCT/KR2023/013312, filed on Sep. 6, 2023, which is based on and claims the benefit of a Korean patent application number 10-2022-0119560, filed on Sep. 21, 2022, in the Korean Intellectual Property Office, the disclosure of which is incorporated by reference herein in its entirety.

TECHNICAL FIELD

The disclosure relates to a wearable device configured to adjust the size of an effective display area depending on external illuminance and a control method thereof.

BACKGROUND ART

Various services and additional functions provided through electronic devices, for example, portable electronic devices such as AR glasses, are gradually increasing. In order to increase the utility value of these electronic devices and satisfy needs of various users, communication service providers or electronic device manufacturers are competitively developing electronic devices to provide various functions and to differentiate themselves from other companies. Accordingly, various functions provided through electronic devices are advancing to a higher level.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

At least one light source (e.g., red green blue light-emitting diode (RGB LED)) included in a display module of a wearable device (e.g., augmented reality (AR) glasses) may output light having different brightness values depending on external illumination. However, output of light having a relatively high brightness value from the display module may cause an increase in color distortion and/or shade distortion of a virtual object viewed through the wearable device. The degree of color distortion and/or shade (e.g., brightness) distortion may increase as the distance from the center of the effective display area (e.g., the area where virtual objects are displayed) and/or angle-of-field area increases.

Aspects of the disclosure are to address at least the above-mentioned problems and/or disadvantages and to provide at least the advantages described below. Accordingly, an aspect of the disclosure is to provide an electronic device for displaying a virtual object with uniform color and/or brightness by controlling a display module to reduce the size of the effective display area in which the virtual object is visible to a user by a specified ratio and display the virtual object within the reduced effective display area in the case where light having a relatively high brightness value of a light source is output in order to improve visibility of a virtual object in an environment having a high illuminance.

Another aspect of the disclosure is to provide an electronic device that, when a virtual object is displayed outside the effective display area or near the edge of the effective display area, may move a display position of the virtual object, thereby displaying the virtual object with uniform color and/or brightness.

Another aspect of the disclosure is to provide a control method of an electronic device for displaying a virtual object with uniform color and/or brightness by controlling a display module to reduce the size of the effective display area in which the virtual object is visible to a user by a specified ratio and display the virtual object within the reduced effective display area in the case where light having a relatively high brightness value of a light source is output in order to improve visibility of a virtual object in an environment having a high illuminance.

Another aspect of the disclosure is to provide a control method of an electronic device for moving, when a virtual object is displayed outside the effective display area or near the edge of the effective display area and when a display is to operate at a specific brightness or more, a display position of the virtual object, thereby displaying the virtual object with uniform color and/or brightness.

Additional aspects will be set forth in part in the description which follows and, in part, will be apparent from the description, or may be learned by practice of the presented embodiments.

Technical Solution

In accordance with an aspect of the disclosure, a wearable device is provided. The wearable device includes a display module and at least one processor, wherein the at least one processor may be configured to control the display module to output light having a first brightness value from at least one light source of the display module so as to display a virtual object in an effective display area having a first size, determine whether or not surrounding illuminance of the wearable device increases while the light having the first brightness value is output, change, based on the determination that the surrounding illuminance increases, a size of the effective display area displaying the virtual object from the first size to a second size, and control the display module to display the virtual object in the effective display area having the second size.

In accordance with another aspect of the disclosure, a method of controlling a wearable device is provided. The method includes controlling a display module of the wearable device to output light having a first brightness value from at least one light source of the display module so as to display a virtual object in an effective display area having a first size, determining whether or not surrounding illuminance of the wearable device increases while the light having the first brightness value is output, changing, based on the determining that the surrounding illuminance increases, a size of the effective display area displaying the virtual object from the first size to a second size, and controlling the display module to display the virtual object in the effective display area having the second size.

Advantageous Effects

According to an embodiment of the disclosure, it is possible to provide an electronic device for displaying a virtual object with uniform color and/or brightness by controlling a display module to reduce the size of the effective display area in which the virtual object is visible to a user by a specified ratio and display the virtual object within the reduced effective display area in the case where light having a relatively high brightness value of a light source is output in order to improve visibility of a virtual object in an environment having a high illuminance.

According to an embodiment of the disclosure, it is possible to provide an electronic device that, when a virtual object is displayed outside the effective display area or near the edge of the effective display area, may move a display position of the virtual object, thereby displaying the virtual object with uniform color and/or brightness.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
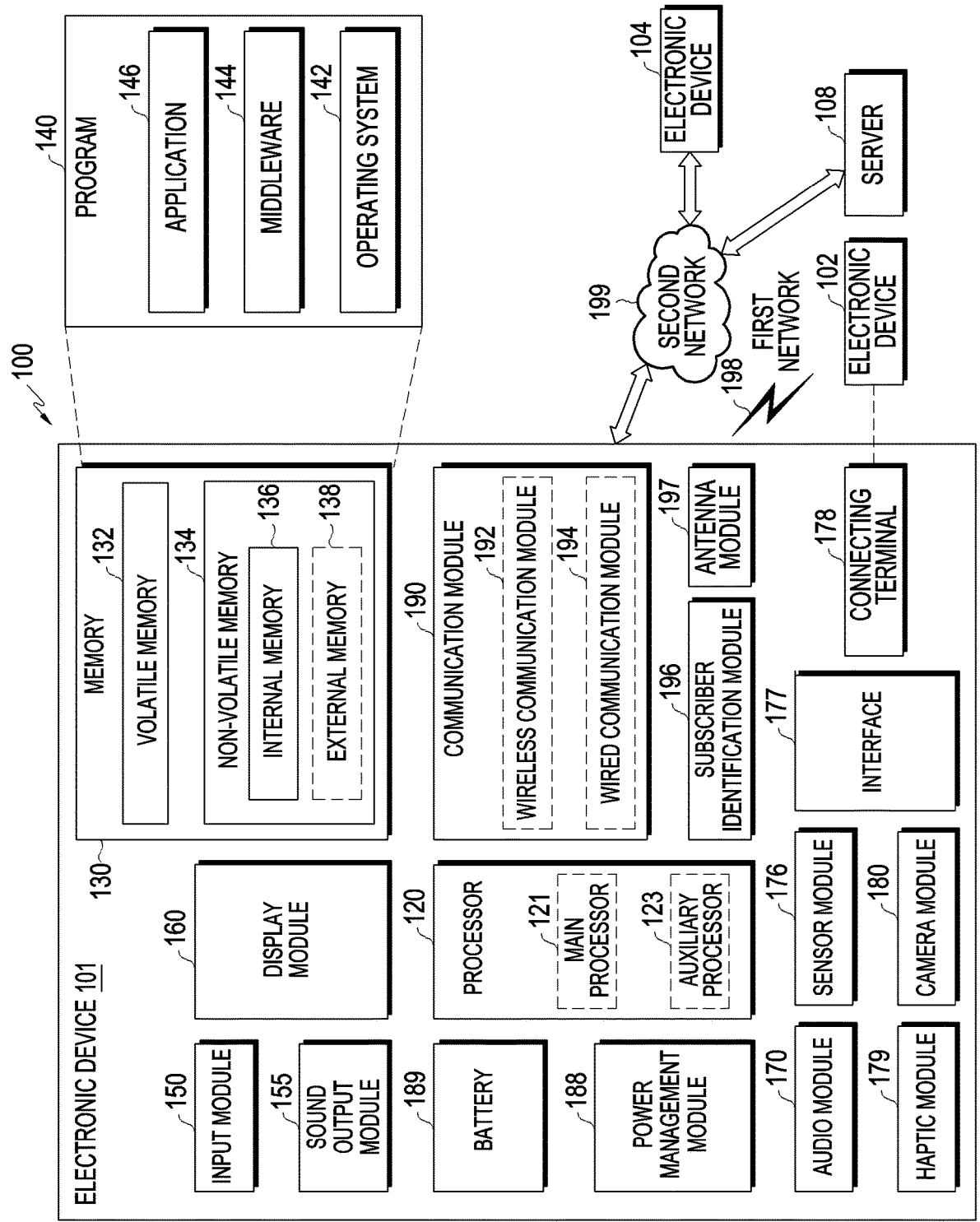
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
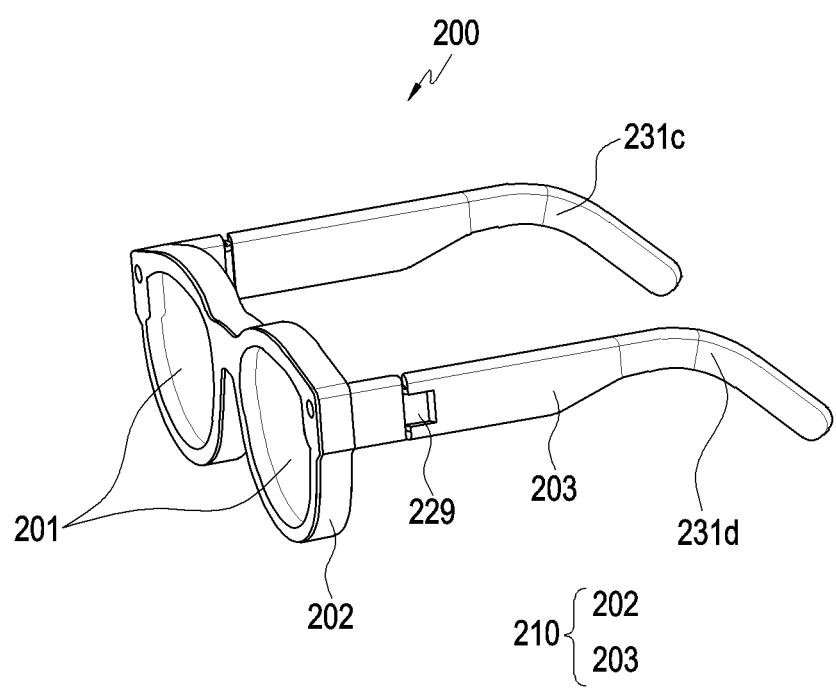
FIG. 2 is a perspective view of a wearable device according to an embodiment of the disclosure.

FIG. 2 is a perspective view of a wearable device 200 according to an embodiment of the disclosure.

Referring to FIG. 2, the wearable device 200 may be an electronic device in the form of glasses, and a user may visually recognize surrounding objects or environments while wearing the wearable device 200. For example, the wearable device 200 may be a head mounting device (HMD) or smart glasses capable of providing an image directly in front of the user's eyes. All or some of the configurations of the wearable device 200 in FIG. 2 may be the same as the configurations of the electronic device 101 in FIG. 1.

According to various embodiments, the wearable device 200 may include a housing 210 forming an exterior of the wearable device 200. The housing 210 may provide a space in which components of the wearable device 200 may be disposed. For example, the housing 210 may include a lens frame 202 and at least one wearing member 203.

According to various embodiments, the wearable device 200 may include a display member 201 capable of providing visual information to a user. For example, the display member 201 may include a lens (e.g., the first window member 420 or the second window member 430 in FIG. 6), a display, a waveguide (e.g., the waveguide 412 in FIG. 6), and/or a module having a touch circuit mounted thereto. According to an embodiment, the display member 201 may be configured to be transparent or translucent. According to an embodiment, the display member 201 may include glass made of a translucent material or a window member capable of adjusting light transmittance by controlling color concentration. According to an embodiment, a pair of display members 201 may be provided and disposed corresponding to the user's left and right eyes, respectively, while the wearable device 200 is worn on the user's body.

According to various embodiments, the lens frame 202 may accommodate at least a portion of the display member 201. For example, the lens frame 202 may surround at least a portion of an edge of the display member 201. According to an embodiment, the lens frame 202 may position at least one of the display members 201 so as to correspond to the user's eyes. According to an embodiment, the lens frame 202 may be a rim of typical eyeglass. According to an embodiment, the lens frame 202 may include at least one closed curve surrounding the display member 201.

According to various embodiments, the wearing member 203 may extend from the lens frame 202. For example, the wearing member 203 may extend from an end of the lens frame 202 and may be supported or positioned on the user's body (e.g., ears) together with the lens frame 202. According to an embodiment, the wearing member 203 may be rotatably coupled to the lens frame 202 through a hinge structure 229. According to an embodiment, the wearing member 203 may include an inner side surface 231c configured to face the user's body and an outer side surface 231d opposite the inner side surface.

According to various embodiments, the wearable device 200 may include a hinge structure 229 configured to fold the wearing member 203 relative to the lens frame 202. The hinge structure 229 may be disposed between the lens frame 202 and the wearing member 203. When the wearable device 200 is not worn, a user may fold the wearing member 203 relative to the lens frame 202 so as to overlap in a portion thereof, thereby carrying or storing the wearable device.

Figure 3:
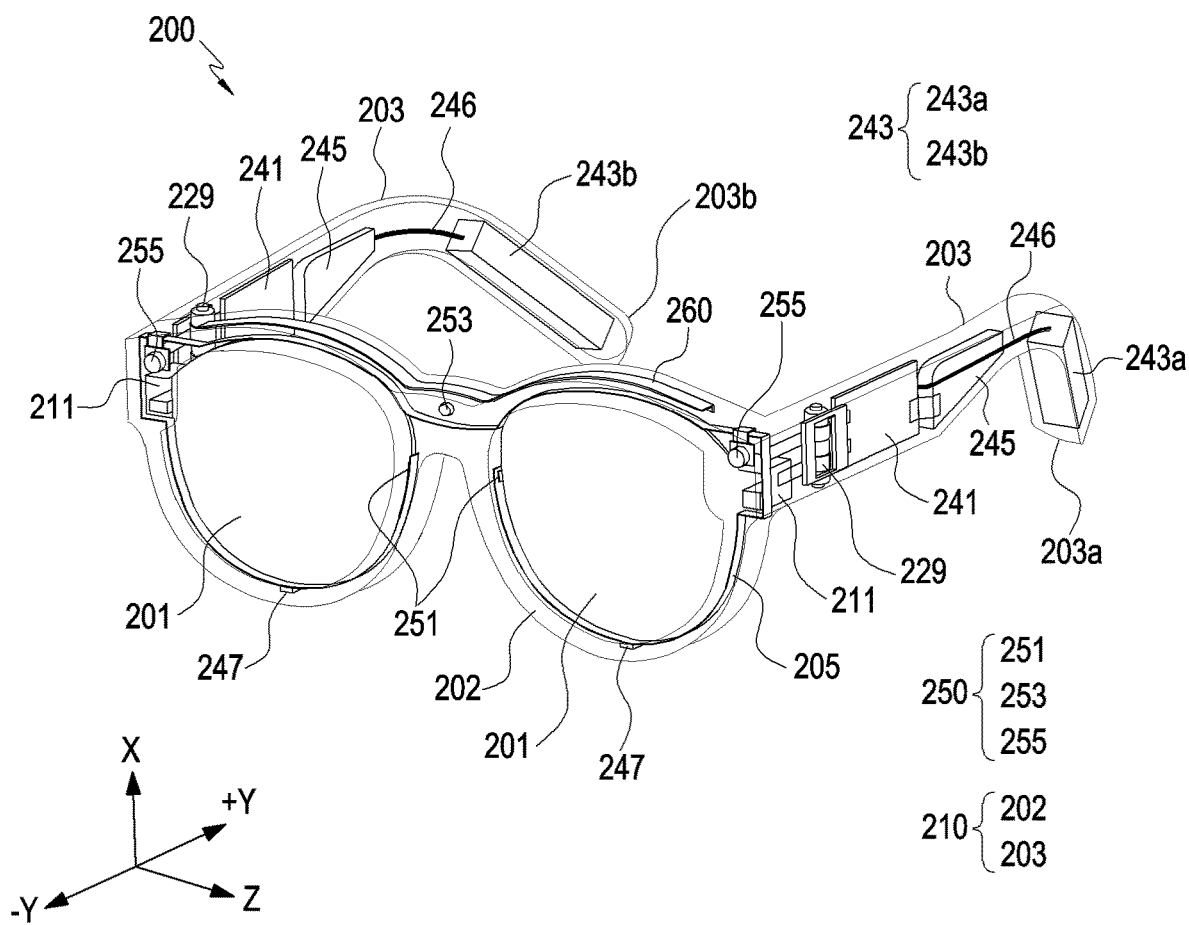
FIG. 3 is a perspective view illustrating an internal configuration of a wearable device according to an embodiment of the disclosure.

FIG. 3 is a perspective view illustrating an internal configuration of a wearable device according to an embodiment of the disclosure.

Figure 4:
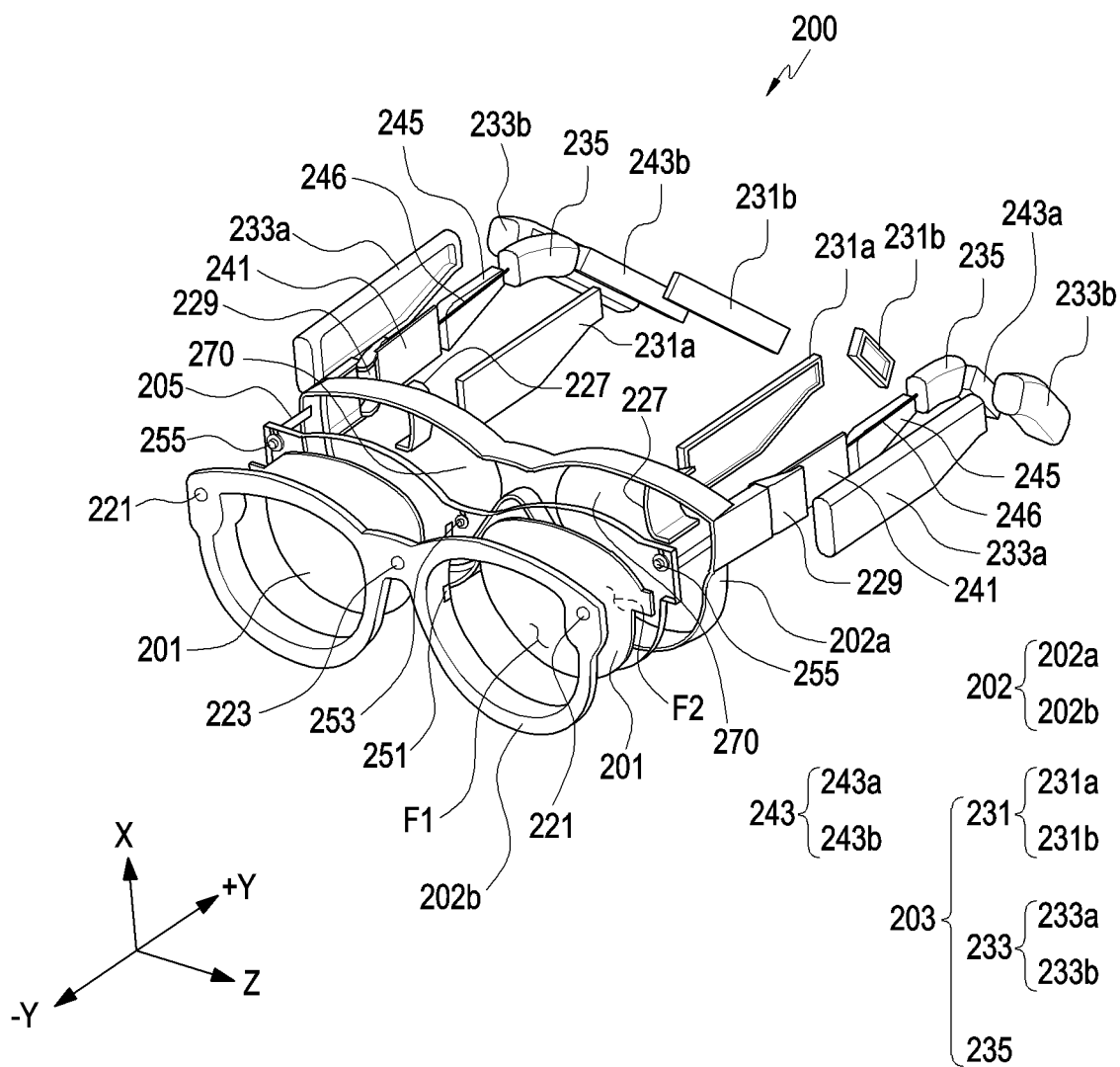
FIG. 4 is an exploded perspective view of a wearable device according to an embodiment of the disclosure.

FIG. 4 is an exploded perspective view of a wearable device according to an embodiment of the disclosure.

Referring to FIGS. 3 and 4, the wearable device 200 may include components (e.g., at least one circuit board 241 (e.g., a printed circuit board (PCB), a printed board assembly (PBA), a flexible PCB (FPCB), or a rigid-flexible PCB (RFPCB)), at least one battery 243, at least one speaker module 245, at least one power transfer structure 246, and a camera module 250) accommodated in a housing 210. All or some of the configurations of the housing 210 in FIG. 3 may be the same as the configurations of the display member 201, the lens frame 202, the wearing member 203, and the hinge structure 229 in FIG. 2.

According to various embodiments, the wearable device 200 may obtain and/or recognize a visual image of objects or environments in a direction (e.g., the −Y direction) in which a user views or in which the wearable device 200 faces using a camera module 250 (e.g., the camera module 180 in FIG. 1), and receive information about objects or environments from an external electronic device (e.g., the electronic devices 102 and 104 or the server 108 in FIG. 1) through a network (e.g., the first network 198 or the second network 199 in FIG. 1). In another embodiment, the wearable device 200 may provide a user with information about objects or environments in a sound or visual form. The wearable device 200 may provide a user with information about objects or environments in a visual form using a display module (e.g., the display module 160 in FIG. 1) through the display member 201. For example, the wearable device 200 may implement information about objects or environments in a visual form and combining the same with real images of the user's surroundings, thereby realizing augmented reality.

According to various embodiments, the display member 201 may include a first surface F1 facing in a direction in which external light is incident (e.g., the −Y direction) and a second surface F2 facing in the opposite direction (e.g., the +Y direction) of the first surface F1. While a user is wearing the wearable device 200, at least a portion of the light or image incident through the first surface F1 may pass through the second surface F2 of the display member 201, disposed to face the left eye and/or right eye of the user, and reach the left eye and/or right eye of the user.

According to various embodiments, the lens frame 202 may include at least two or more frames. For example, the lens frame 202 may include a first frame 202a and a second frame 202b. According to an embodiment, when a user wears the wearable device 200, the first frame 202a may be a frame portion facing the user's face, and the second frame 202b may be a portion of the lens frame 202 spaced apart from the first frame 202a in the direction of the user's gaze (e.g., the −Y direction).

According to various embodiments, the light output module 211 may provide an image and/or video to a user. For example, the light output module 211 may include a display panel (not shown) capable of outputting an image and a lens (not shown) corresponding to the user's eyes and guiding the image to the display member 201. For example, a user may obtain an image output from a display panel of the light output module 211 through a lens of the light output module 211. According to various embodiments, the light output module 211 may include a device configured to display a variety of information. For example, the light output module 211 may include at least one of a liquid crystal display (LCD), a digital mirror device (DMD), a liquid crystal on silicon (LCoS), an organic light-emitting diode (OLED), or a micro light-emitting diode (micro LED). According to an embodiment, in the case where the light output module 211 and/or the display member 201 includes one of the LCD, DMD, and LCoS, the wearable device 200 may include a light source emitting light to the display area of the light output module 211 and/or the display member 201. According to another embodiment, in the case where the light output module 211 and/or the display member 201 includes one of the OLED or micro LED, the wearable device 200 may not include a separate light source and may provide a virtual image to a user.

According to various embodiments, at least a portion of the light output module 211 may be disposed within the housing 210. For example, the light output modules 211 may be disposed in the wearing member 203 or the lens frame 202 so as to correspond to the user's right eye and left eye, respectively. According to an embodiment, the light output module 211 may be connected to the display member 201 and provide an image to a user through the display member 201.

According to various embodiments, the circuit board 241 may include components for driving the wearable device 200. For example, the circuit board 241 may include at least one integrated circuit chip, and at least one of the processor 120, the memory 130, the power management module 188, or the communication module 190 in FIG. 1 may be provided on the integrated circuit chip. According to an embodiment, the circuit board 241 may be disposed in the wearing member 203 of the housing 210. According to an embodiment, the circuit board 241 may be electrically connected to the battery 243 through the power transfer structure 246. According to an embodiment, the circuit board 241 may be connected to a flexible printed circuit board 205, and electrical signals may be transmitted to electronic components (e.g., the light output module 211, the camera module 250, and the light-emitting unit (e.g., the light-emitting unit 330 in FIG. 5)) through flexible printed circuit board 205. According to an embodiment, the circuit board 241 may be a circuit board including an interposer.

According to various embodiments, the flexible printed circuit board 205 may extend from the circuit board 241 across the hinge structure 229 to the interior of the lens frame 202 to be disposed in at least a portion of the circumference of the display member 201 inside the lens frame 202.

According to various embodiments, the battery 243 (e.g., the battery 189 in FIG. 1) may be electrically connected to the components (e.g., the light output module 211, the circuit board 241, the speaker module 245, the microphone module 247, and the camera module 250) of the wearable device 200 and may supply power to the components of the wearable device 200.

According to various embodiments, at least a portion of the battery 243 may be disposed in the wearing member 203. According to an embodiment, the batteries 243 may be disposed at the ends 203a and 203b of the wearing member 203. For example, the batteries 243 may include a first battery 243a disposed at the first end 203a of the wearing member 203 and a second battery 243b disposed at the second end 203b thereof.

According to various embodiments, the speaker module 245 (e.g., the audio module 170 or the sound output module 155 in FIG. 1) may convert an electrical signal into sound. At least a portion of the speaker module 245 may be disposed inside the wearing member 203 of the housing 210. According to an embodiment, the speaker module 245 may be positioned inside the wearing member 203 so as to correspond to the user's ear. For example, the speaker module 245 may be disposed between the circuit board 241 and the battery 243.

According to various embodiments, the power transfer structure 246 may transfer power from the battery 243 to the electronic components (e.g., the light output module 211) of the wearable device 200. For example, the power transfer structure 246 may be electrically connected to the battery 243 and/or the circuit board 241, and the circuit board 241 may transfer power received through the power transfer structure 246 to the light output module 211. According to an embodiment, the power transfer structure 246 may be connected to the circuit board 241 by pass through the speaker module 245. For example, when the wearable device 200 is viewed from the side (e.g., in the Z-axis direction), the power transfer structure 246 may at least partially overlap the speaker module 245.

According to various embodiments, the power transfer structure 246 may be a configuration capable of transferring power. For example, the power transfer structure 246 may include a flexible printed circuit board or wire. For example, the wire may include a plurality of cables (not shown). In various embodiments, the form of the power transfer structure 246 may be variously modified in consideration of the number and/or type of cables.

According to various embodiments, the microphone module 247 (e.g., the input module 150 and/or the audio module 170 in FIG. 1) may convert sound into an electrical signal. According to an embodiment, the microphone module 247 may be disposed in at least a portion of the lens frame 202. For example, at least one microphone module 247 may be disposed at a lower end (e.g., in a direction toward the −X axis) and/or an upper end (e.g., in a direction toward the X axis) of the wearable device 200. According to various embodiments, the wearable device 200 may more clearly recognize a user's voice using voice information (e.g., sound) obtained from at least one microphone module 247. For example, the wearable device 200 may discriminate between voice information and ambient noise, based on obtained voice information and/or additional information (e.g., low-frequency vibrations of the user's skin and bones). For example, the wearable device 200 may clearly recognize a user's voice and perform a function (e.g., noise canceling) of reducing ambient noise.

According to various embodiments, the camera module 250 may capture still images and/or moving images. The camera module 250 may include at least one of a lens, at least one image sensor, an image signal processor, or a flash. According to an embodiment, the camera module 250 may be disposed inside the lens frame 202 and disposed around the display member 201.

According to various embodiments, the camera module 250 may include at least one first camera module 251. According to an embodiment, the first camera module 251 may capture the trajectory of the user's eyes (e.g., pupils) or gaze. For example, the first camera module 251 may capture a reflection pattern of light emitted from a light-emitting unit (e.g., the light-emitting unit 330 in FIG. 5) to the user's eyes. For example, the light-emitting unit 330 may emit light in an infrared band for tracking the gaze trajectory using the first camera module 251. For example, the light-emitting unit 330 may include an IR LED. According to an embodiment, the processor (e.g., the processor 120 in FIG. 1) may adjust the position of the virtual image projected onto the display member 201 to correspond to the direction of the user's gaze. According to an embodiment, the first camera module 251 may include a global shutter (GS) type camera, and the trajectory of the user's eye or gaze may be traced using a plurality of first camera modules 251 having the same specification and performance.

According to various embodiments, the first camera module 251 may periodically or aperiodically transmit information (e.g., trajectory information) related to the trajectory of the user's eyes or gaze to the processor (e.g., the processor 120 in FIG. 1). According to another embodiment, when the first camera module 251 detects that the user's gaze has changed based on the trajectory information (e.g., the eyes move more than a reference value while the head is not moving), the first camera module 251 may transmit the trajectory information to the processor.

According to various embodiments, the camera module 250 may include a second camera module 253. According to an embodiment, the second camera module 253 may capture external images. According to an embodiment, the second camera module 253 may be a global shutter type or rolling shutter (RS) type camera. According to an embodiment, the second camera module 253 may capture external images through a second optical hole 223 formed in the second frame 202b. For example, the second camera module 253 may include a high-resolution color camera and may be a high-resolution (HR) or photo video (PV) camera. In addition, the second camera module 253 may provide an auto focus (AF) function and an optical image stabilizer (OIS) function.

According to various embodiments, the wearable device 200 may include a flash (not shown) positioned adjacent to the second camera module 253. For example, the flash (not shown) may provide light for increasing the brightness (e.g., illuminance) around the wearable device 200 when obtaining external images by the second camera module 253, thereby easing the difficulty in obtaining an image due to a dark environment, mixing of various light sources, and/or reflection of light.

According to various embodiments, the camera module 250 may include at least one third camera module 255. According to an embodiment, the third camera module 255 may capture user's motions through a first optical hole 221 formed in the lens frame 202. For example, the third camera module 255 may capture user's gestures (e.g., hand motions). The third camera module 255 and/or the first optical hole 221 may be disposed at both side ends of the lens frame 202 (e.g., the second frame 202b), for example, at both ends of the lens frame 202 (e.g., the second frame 202b) in the X direction. According to an embodiment, the third camera module 255 may be a global shutter (GS) type camera. For example, the third camera module 255 may be a camera supporting 3 degrees of freedom (3DoF) or 6DoF, which may provide location recognition and/or movement recognition in a 360-degree space (e.g., omnidirectional recognition). According to an embodiment, the third camera module 255 may be a stereo camera and perform simultaneous localization and mapping (SLAM) and user motion recognition using a plurality of global shutter type cameras of the same specification and performance. According to an embodiment, the third camera module 255 may include an infrared (IR) camera (e.g., a time-of-flight (TOF) camera or a structured light camera). For example, the IR camera may operate as at least a part of a sensor module (e.g., the sensor module 176 in FIG. 1) for detecting a distance to a subject.

According to an embodiment, at least one of the first camera module 251 or the third camera module 255 may be replaced with a sensor module (e.g., the sensor module 176 in FIG. 1) (e.g., a lidar sensor). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photo diode may be referred to as a photo detector or a photo sensor.

According to an embodiment, at least one of the first camera module 251, the second camera module 253, and the third camera module 255 may include a plurality of camera modules (not shown). For example, the second camera module 253 may be configured as a plurality of lenses (e.g., wide-angle and telephoto lenses) and image sensors, and may be disposed on one side (e.g., the side facing the −Y axis) of the wearable device 200. For example, the wearable device 200 may include a plurality of camera modules having different properties (e.g., angle of view) or functions from each other and, based on user selection and/or trajectory information, perform control to change the angle of view of the camera module. For example, at least one of the plurality of camera modules may be a wide-angle camera and at least another thereof may be a telephoto camera.

According to various embodiments, the processor (e.g., the processor 120 in FIG. 1) may determine movement of a user and/or movement of the wearable device 200 using information of the wearable device 200 obtained using at least one of a gesture sensor, a gyro sensor, or an acceleration sensor of a sensor module (e.g., the sensor module 176 in FIG. 1) and the user's motion (e.g., the user's body approaching the wearable device 200) obtained using the first camera module 251. According to an embodiment, the wearable device 200 may include a magnetic (geomagnetic) sensor capable of measuring directions using a magnetic field and magnetic force, and/or the Hall sensor capable of obtaining movement information (e.g., movement direction or moving distance) using the strength of a magnetic field, in addition to the sensors described above. For example, the processor may determine the movement of the wearable device 200 and/or the movement of the user, based on information obtained from the magnetic (geomagnetic) sensor and/or the Hall sensor.

According to various embodiments (not shown), the wearable device 200 may perform an input function (e.g., a touch and/or pressure sensing function) enabling interactions with a user. For example, an element (e.g., a touch sensor and/or a pressure sensor) configured to perform a touch and/or pressure sensing function may be disposed in at least a portion of the wearing member 203. The wearable device 200 may control virtual images output through the display member 201, based on information obtained through the element. For example, sensors related to a touch and/or pressure sensing function may be configured in a variety of ways such as a resistive type, a capacitive type, an electromagnetic type (EM), or an optical type. According to an embodiment, configurations of the element configured to perform a touch and/or pressure sensing function may be entirely or partially the same as those of the input module 150 in FIG. 1.

According to various embodiments, the wearable device 200 may include a reinforcing member 260 that is disposed in the inner space of the lens frame 202 and formed to have a rigidity higher than that of the lens frame 202.

According to various embodiments, the wearable device 200 may include a lens structure 270. The lens structure 270 may refract at least a portion of light. For example, the lens structure 270 may be a prescription lens having a predetermined refractive power. According to an embodiment, the lens structure 270 may be disposed behind (e.g., in the +Y direction) the second window member (e.g., the second window member 430 in FIG. 6) of the display member 201. For example, the lens structure 270 may be positioned between the display member 201 and the user's eyes. For example, the lens structure 270 may face one surface (e.g., the second outer surface 430b in FIG. 6) of the display member (e.g., the display member 400 in FIG. 6).

According to various embodiments, the housing 210 may include a hinge cover 227 capable of concealing a part of the hinge structure 229. Another part of the hinge structure 229 may be accommodated or concealed between an inner case 231 and an outer case 233, which will be described later.

According to various embodiments, the wearing member 203 may include an inner case 231 and an outer case 233. The inner case 231 is, for example, a case configured to face or come into direct contact with the user's body, and may be made of a material having low thermal conductivity, for example, synthetic resin. According to an embodiment, the inner case 231 may include an inner side surface (e.g., the inner side surface 231c in FIG. 2) facing the user's body. The outer case 233 may at least partially include, for example, a heat-conductive material (e.g., a metal material) and may be coupled to the inner case 231 so as to face the same. According to an embodiment, the outer case 233 may include an outer side surface (e.g., the outer side surface 231d in FIG. 2) opposite the inner side surface 231c. In an embodiment, at least one of the circuit board 241 or the speaker module 245 may be accommodated in a space of the wearing member 203, which is separated from the battery 243. In the illustrated embodiment, the inner case 231 may include a first case 231a including the circuit board 241 or the speaker module 245 and a second case 231b accommodating the battery 243, and the outer case 233 may include a third case 233a coupled to the first case 231a so as to face the same and a fourth case 233b coupled to the second case 231b so as to face the same. For example, the first case 231a and the third case 233a may be coupled (hereinafter, "first case parts 231a and 233a") to accommodate the circuit board 241 and/or the speaker module 245, and the second case 231b and the fourth case 233b may be coupled (hereinafter "second case parts 231b and 233b") to accommodate the battery 243.

According to various embodiments, the first case parts 231a and 233a may be rotatably coupled to the lens frame 202 through the hinge structure 229, and the second case parts 231b and 233b may be connected or mounted to an end of the first case parts 231a and 233a through a connection member 235. In some embodiments, a portion of the connection member 235 that comes into contact with the user's body may be made of a material with low thermal conductivity, for example, an elastic material such as silicone, polyurethane, or rubber, and a portion thereof that does not come into contact with the user's body may be made of a material with high thermal conductivity (e.g., a metal material). For example, when heat is generated from the circuit board 241 or the battery 243, the connection member 235 may block the transfer of heat to a portion in contact with the user's body and disperse or release the heat through a portion that is not in contact with the user's body. According to an embodiment, a portion of the connection member 235 configured to come into contact with the user's body may be interpreted as a part of the inner case 231, and a portion of the connection member 235 that does not come into contact with the user's body may be interpreted as a part of the outer case 233. According to an embodiment (not shown), the first case 231a and the second case 231b may be integrally configured without the connection member 235, and the third case 233a and the fourth case 233b may be integrally configured without the connection member 235. According to various embodiments, other elements (e.g., the antenna module 197 in FIG. 1) may be further included in addition to the illustrated elements, and information about objects or environments may be received from external electronic devices (e.g., the electronic devices 102 and 104 or the server 108 in FIG. 1) through a network (e.g., the first network 198 or the second network 199 in FIG. 1) using the communication module 190.

Although only the wearable device 200 is shown and described in FIGS. 2 to 4, the disclosure is not limited thereto, and some elements of the wearable device 200 shown in FIGS. 2 to 4 may also be included in electronic devices such as smartphones and tablet PCs.

Figure 5:
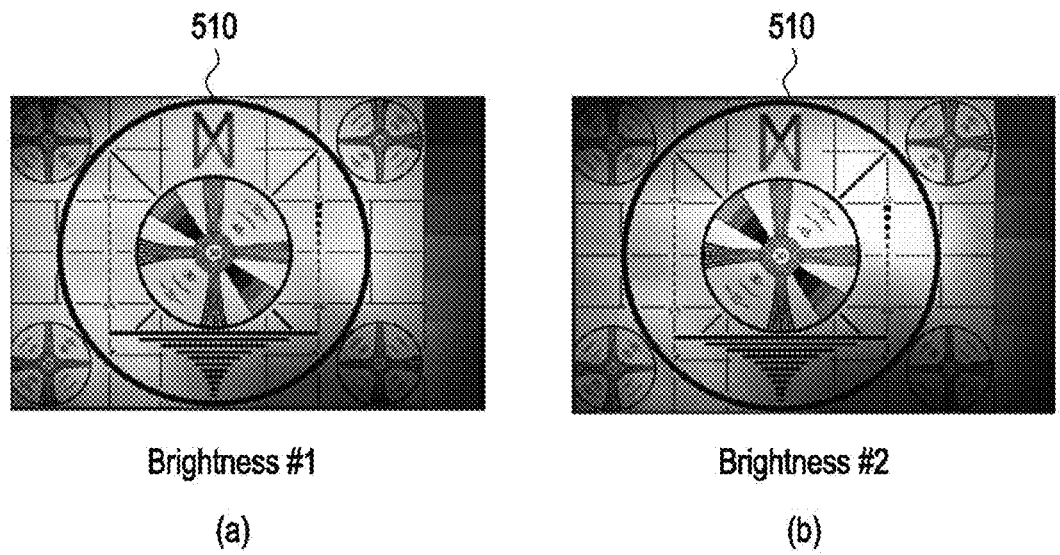
FIG. 5 is a diagram illustrating the case where color distortion and/or shade (e.g., brightness) distortion occurs in a virtual object when the intensity of light output from a light source of a display module increases according to an embodiment of the disclosure.

FIG. 5 is a diagram illustrating the case where color distortion and/or shade (e.g., brightness) distortion occurs in a virtual object 510 when the intensity of light output from a light source (e.g., an RGB light source) of a display module (e.g., the light output module 211) increases according to an embodiment of the disclosure.

Referring to FIG. 5, part (a) of FIG. 5 is a diagram of a virtual object 510 displayed through the wearable device 200 (e.g., the electronic device 101 in FIG. 1) when light having a brightness value less than that of part (b) of FIG. 5 is output. As shown in FIG. 5, as the intensity of light output from a light source of the display module (e.g., the light output module 211) increases, color distortion and/or shade (e.g., brightness) distortion may increase.

Figure 6:
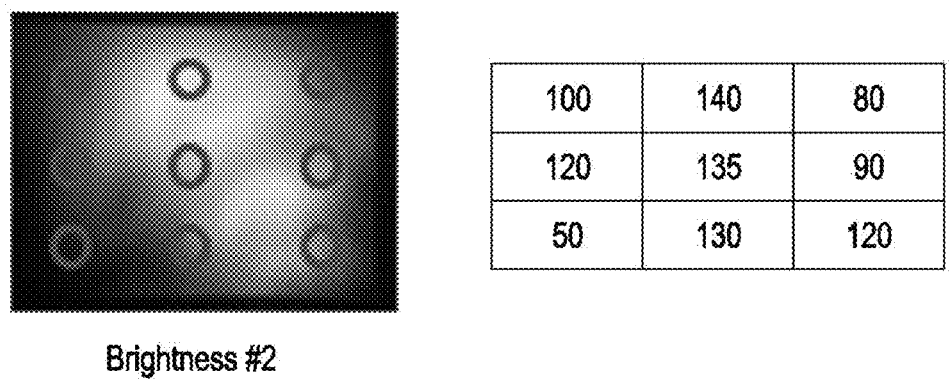
FIG. 6 is a diagram illustrating the case where uniformity of a virtual object deteriorates when light having an increased brightness is output according to an embodiment of the disclosure.

FIG. 6 is a diagram illustrating the case where uniformity of a virtual object 510 deteriorates when light having an increased brightness is output according to an embodiment of the disclosure.

Referring to FIG. 6, when brightness is measured by dividing a display panel of the display module (e.g., the light output module 211) into 9 points as shown in FIG. 6, the upper middle portion of the display panel may have the highest brightness. This is due to the fact that the light output from the light source is incident on the upper middle portion of the display panel so that the upper middle portion of the display panel has the highest brightness and so that portions farther away from the upper middle portion have a lower brightness. In addition, a difference in wavelength between light sources (e.g., RGB light sources) may degrade uniformity in the portion that is farther away from the center of the display panel. Accordingly, referring to part (b) of FIG. 5, color distortion and/or shade (e.g., brightness) distortion of the virtual object 510 may increase.

Figure 7:
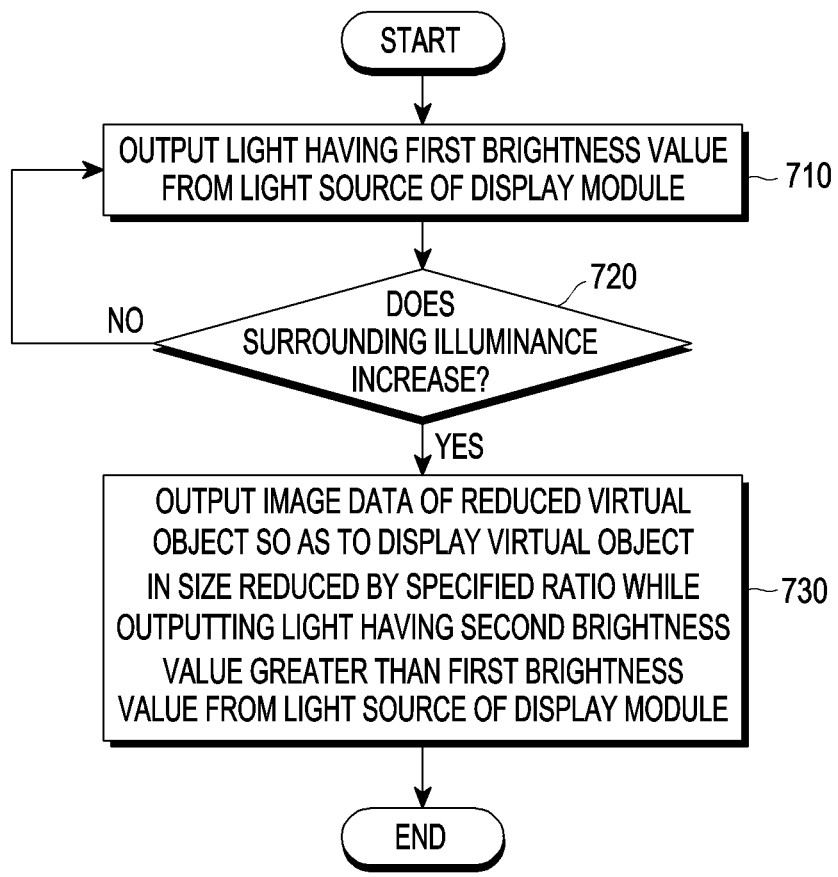
FIG. 7 is a diagram illustrating a function or operation of reducing the size of an effective display area and displaying a virtual object, when the intensity of light output from a display module is increased, by a wearable device according to an embodiment of the disclosure.

FIG. 7 is a diagram illustrating a function or operation of reducing the size of an effective display area 820 and displaying a virtual object 510, when the intensity of light output from a display module (e.g., the light output module 211) is increased, by a wearable device 200 according to an embodiment of the disclosure.

Figure 8:
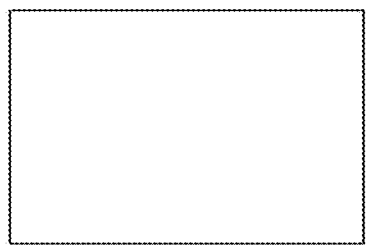
FIG. 8 is a diagram illustrating a function or operation of displaying a virtual object in an effective display area having a reduced size and processing the remaining area of an angle-of-field area, excluding the effective display area, using a specified color (e.g., black) according to an embodiment of the disclosure.
Figure 8:
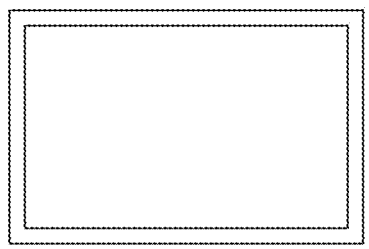
Figure 8:
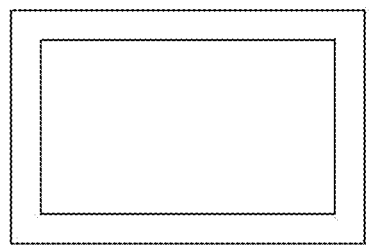
Figure 8:
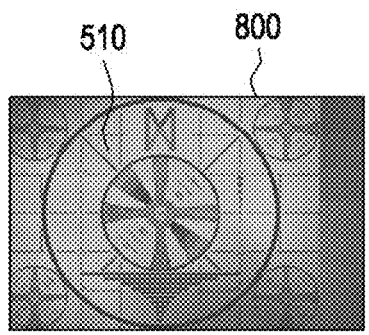
Figure 8:
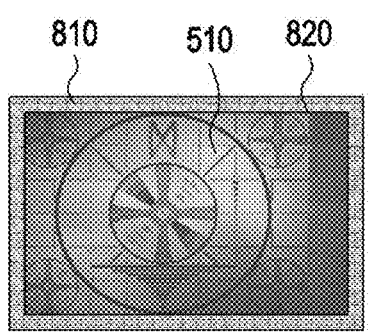
Figure 8:
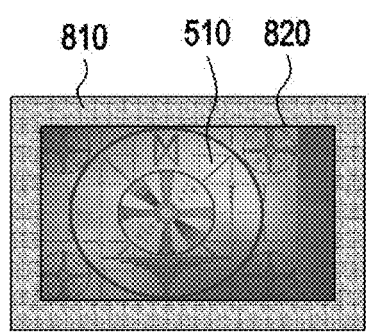

FIG. 8 is a diagram illustrating a function or operation of displaying a virtual object 510 in an effective display area 820 having a reduced size and processing the remaining area of an angle-of-field area 800, excluding the effective display area 820, using a specified color (e.g., black) according to an embodiment of the disclosure.

Referring to FIG. 7, in operation 710, the wearable device 200 according to an embodiment of the disclosure may output light having a first brightness value (e.g., a brightness value of 50%) from a light source of a display module (e.g., the light output module 211). Accordingly, the virtual object 510 may be shown to a user wearing the wearable device 200 referring to part (a) of FIG. 8. The size of the virtual object 510 according to an embodiment of the disclosure may be substantially the same as the size of the angle-of-field area 800.

The wearable device 200 according to an embodiment of the disclosure may determine whether or not surrounding illuminance is increased in operation 720. The wearable device 200 according to an embodiment of the disclosure may include at least one sensor for sensing a surrounding illuminance value. The wearable device 200 (e.g., the processor 120) according to an embodiment of the disclosure may determine whether or not a surrounding illuminance value is increased using sensing data transmitted from at least one sensor.

In operation 730, based on determining that the surrounding illuminance is increased, the wearable device 200 according to an embodiment of the disclosure may reduce the size of the effective display area 820 according to a specified ratio while outputting light having a second brightness value greater than the first brightness value from the light source of the display module (e.g., the light output module 211). According to an embodiment of the disclosure, the reduced size of the effective display area 820 may be substantially less than the size of the angle-of-field area 800. The wearable device 200 according to an embodiment of the disclosure may determine the specified ratio using a lookup table defining a relationship between the brightness of light output from the light source and a specified ratio for reducing the display area. If the intensity of light output from the light source increases (e.g., a brightness value of 70%) referring to part (b) of FIG. 8, the wearable device 200 according to an embodiment of the disclosure may reduce the size of the effective display area 820 according to a first specified ratio. If the intensity of light output from the light source increases (e.g., a brightness value of 100%) referring to part (c) of FIG. 8, the wearable device 200 according to an embodiment of the disclosure may reduce the size of the effective display area 820 according to a second specified ratio. The display module (e.g., the light output module 211) may be controlled such that an area (e.g., an edge area) of the angle-of-field area 800 according to an embodiment of the disclosure, excluding the effective display area 820, is displayed to the user in a specified color (e.g., black). The size of the angle-of-field area 800 according to an embodiment of the disclosure may be substantially the same as the size of the display panel of the display module (e.g., the light output module 211). The virtual object 510 according to an embodiment of the disclosure may be reduced by a specified ratio to fit the reduced size of the effective display area 820 and then displayed within the effective display area 820. According to such a function or operation, when light having a relatively high brightness value of a light source is output to improve the visibility of the virtual object 510 in an environment having a high illuminance, the wearable device 200 according to an embodiment of the disclosure may control the display module (e.g., the light output module 211) to reduce the size of the effective display area 820 in which the virtual object 510 is displayed to the user by a specified ratio and displaying the virtual object 510 within the effective display area 820 having a reduced size, thereby providing the virtual object 510 having uniform color and/or brightness to the user.

Figure 9:
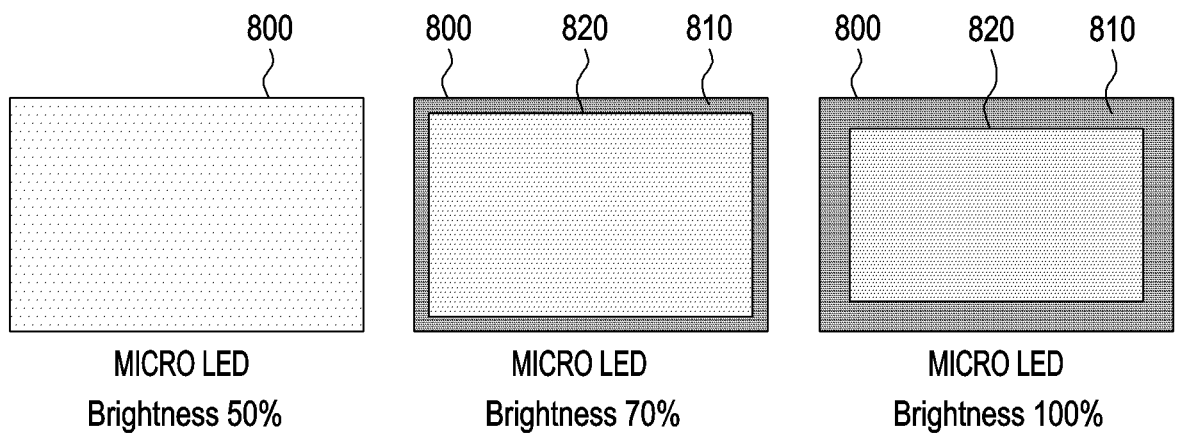
FIG. 9 is a diagram illustrating a function or operation of reducing an effective display area by turning off LEDs corresponding to an edge portion of a display depending on external illuminance in the case where a display module includes micro LEDs according to an embodiment of the disclosure.

FIG. 9 is a diagram illustrating a function or operation of reducing an effective display area 820 by turning off LEDs corresponding to an edge portion of a display depending on external illuminance in the case where a display module (e.g., the light output module 211) includes micro LEDs according to an embodiment of the disclosure.

Referring to part (a) of FIG. 9, the wearable device 200 according to an embodiment of the disclosure may control a display module (e.g., the light output module 211) to display a virtual object 510, having a size substantially the same as the size of the angle-of-field area 800, in the effective display area 820. In this case, the size of the effective display area 820 according to an embodiment of the disclosure may be substantially the same as the size of the angle-of-field area 800.

Referring to part (b) of FIG. 9, when the intensity of light output from a light source increases (e.g., a brightness value of 70%), the wearable device 200 according to an embodiment of the disclosure may reduce the size of the effective display area 820 by a first specified ratio. In the case where the display module (e.g., the light output module 211) is implemented as micro LEDs, the wearable device 200 according to an embodiment of the disclosure may switch LEDs corresponding to an edge area of the effective display area 820 from an On state to an Off state, thereby changing (e.g., reducing) the size of the effective display area 820. If the intensity of light output from a light source increases (e.g., a brightness value of 100%) referring to part (c) of FIG. 9, the wearable device 200 according to an embodiment of the disclosure may reduce the size of the effective display area 820 by a second specified ratio. According to an embodiment of the disclosure, the first specified ratio may be less than the second specified ratio.

Figure 10:
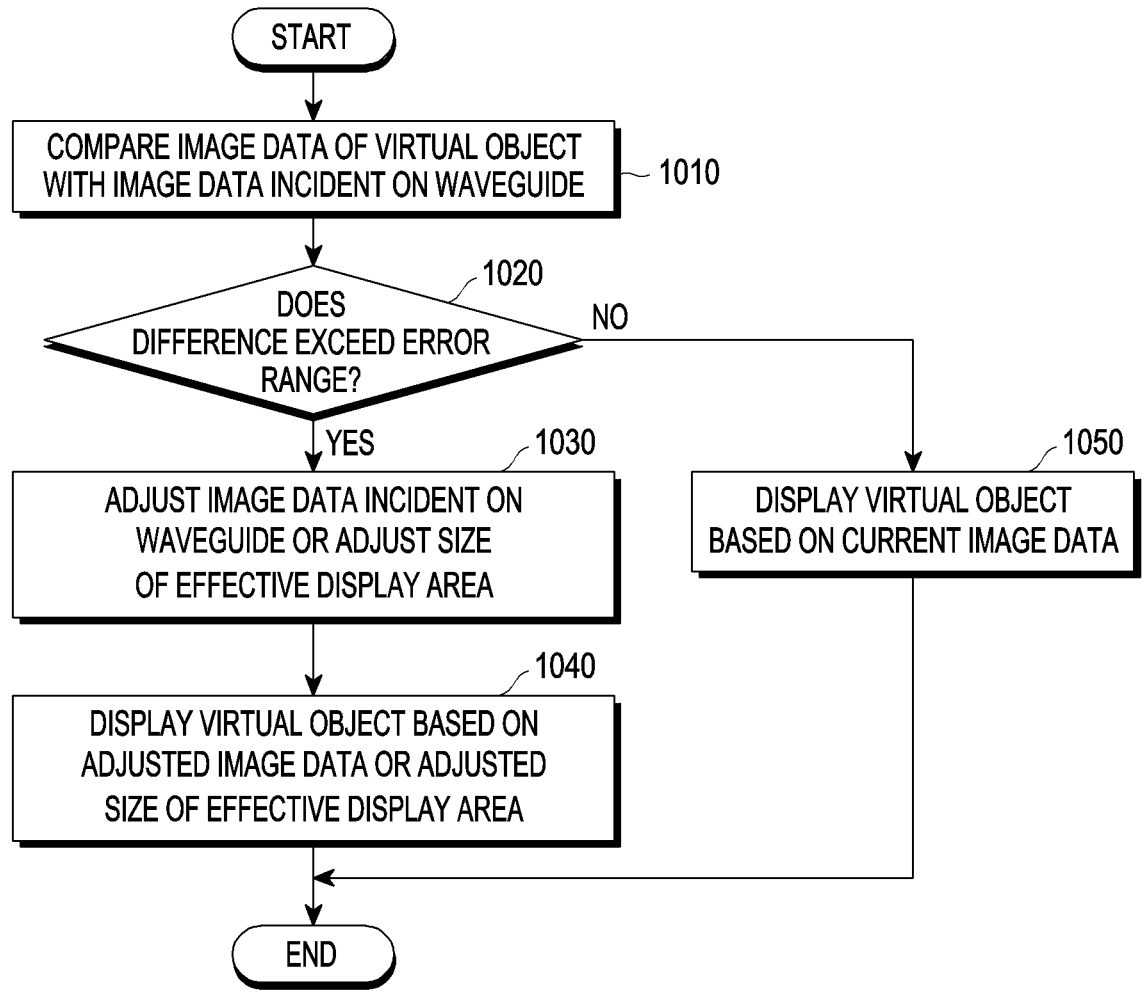
FIG. 10 is a diagram illustrating a function or operation of adjusting image data or an effective display area when image data (e.g., RGB values) of a virtual object is different from image data (e.g., RGB values) incident on a waveguide according to an embodiment of the disclosure.

FIG. 10 is a diagram illustrating a function or operation of adjusting image data or an effective display area 820 when image data (e.g., RGB values) of a virtual object 510 is different from image data (e.g., RGB values) incident on a waveguide according to an embodiment of the disclosure.

Referring to FIG. 10, the wearable device 200 according to an embodiment of the disclosure may compare image data (e.g., RGB values) of a virtual object 510 with image data (e.g., RGB values) incident on a waveguide in operation 1010. The wearable device 200 according to an embodiment of the disclosure may include at least one sensor for comparing image data (e.g., RGB values) of the virtual object 510 with image data (e.g., RGB values) incident on the waveguide. The wearable device 200 (e.g., the processor 120) according to an embodiment of the disclosure may determine whether or not the image data are different from each other using sensing data transmitted from at least one sensor.

The wearable device 200 according to an embodiment of the disclosure may determine whether or not a difference in the image data exceeds an error range in operation 1020.

Based on determining that a difference in the image data exceeds the error range, the wearable device 200 according to an embodiment of the disclosure may adjust the image data incident on the waveguide (e.g., increase or reduce at least one of the RGB values) or adjust the size of the effective display area 820 in operation 1030. If it is determined that an average value of image data (e.g., an average value of RGB values of the virtual object in a specific area) exceeds an error range, the wearable device 200 according to an embodiment of the disclosure may determine a specified ratio using a lookup table defining a relationship between differences and specified ratios for reducing the display area. The wearable device 200 according to an embodiment of the disclosure may control a display module (e.g., the light output module 211) to display the virtual object in the effective display area 820 that is reduced by the specified ratio.

In operation 1040, the wearable device 200 according to an embodiment of the disclosure may display the virtual object 510 (e.g., control the display module (e.g., the light output module 211) to display the virtual object 510 to the user), based on the adjusted image data or the adjusted size of the effective display area 820.

Based on determining that a difference in the image data does not exceed the error range, the wearable device 200 according to an embodiment of the disclosure may display the virtual object 510, based on the current image data, in operation 1050.

Figure 11:
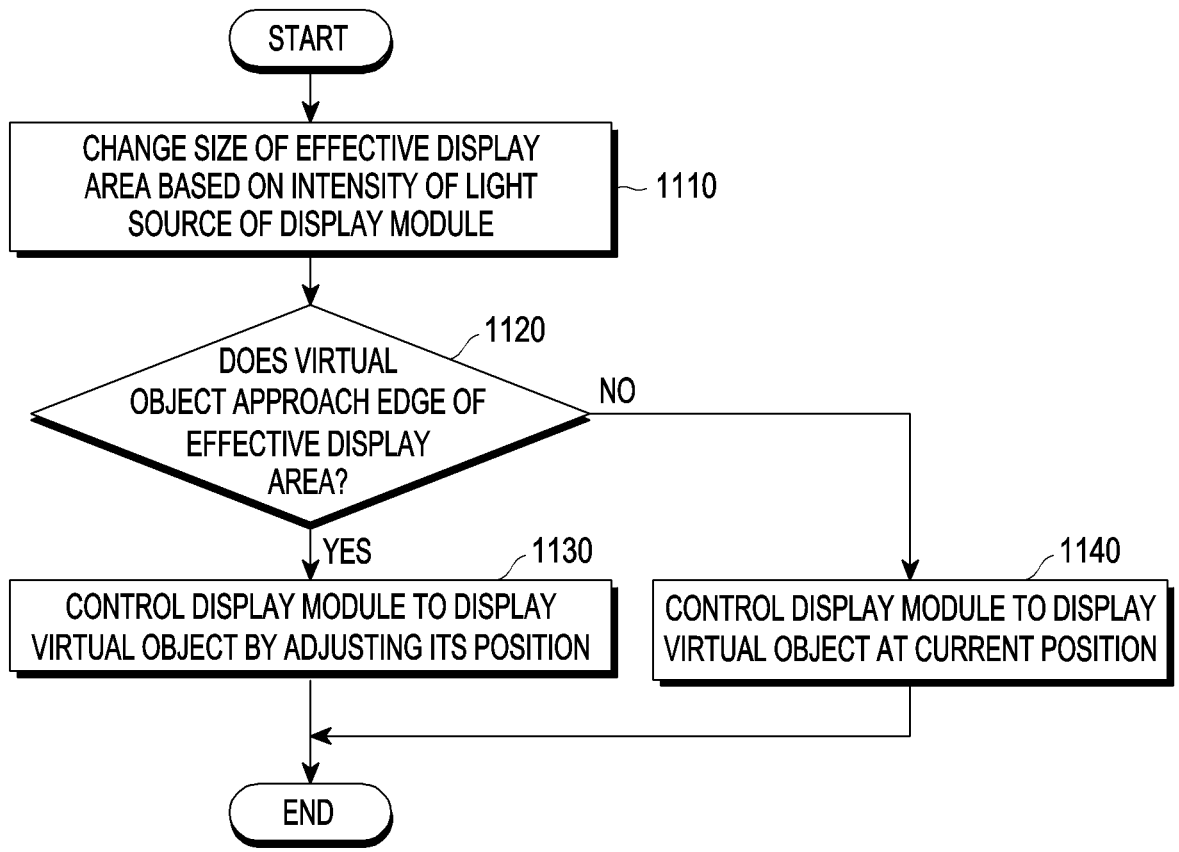
FIGS. 11 and 12 are diagrams illustrating a function or operation of adjusting a position at which a virtual object is displayed in the case where the virtual object is displayed near an edge of an effective display area according to various embodiments of the disclosure.
Figure 12:
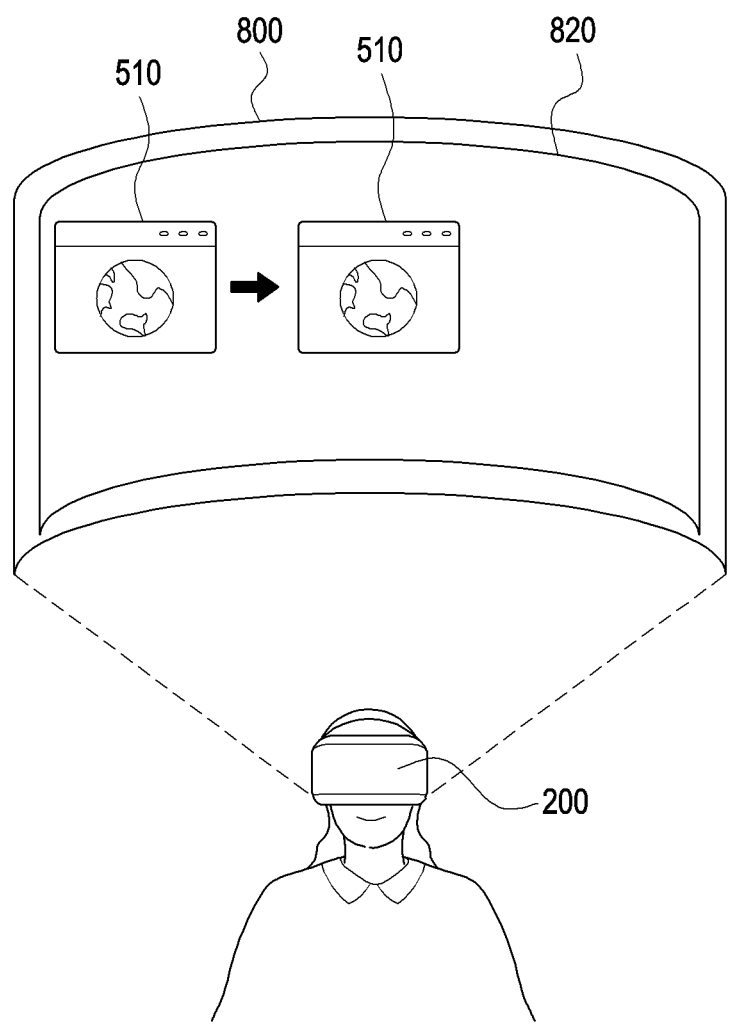

FIGS. 11 and 12 are diagrams illustrating a function or operation of adjusting a position at which a virtual object 510 is displayed in the case where the virtual object 510 is displayed near an edge of an effective display area 820 according to various embodiments of the disclosure.

Referring to FIG. 11, the wearable device 200 according to an embodiment of the disclosure, in operation 1110, may change the size of an effective display area 820, based on the intensity of a light source of a display module (e.g., the light output module 211). The wearable device 200 according to an embodiment of the disclosure may change the size of the effective display area 820 according to various embodiments of the disclosure described with reference to FIG. 7 and the like.

The wearable device 200 according to an embodiment of the disclosure may determine whether or not the virtual object 510 approaches an edge of the effective display area 820 in operation 1120. Operation 1120 according to an embodiment of the disclosure may include an operation of determining whether or not at least a portion of the virtual object 510 exceeds the effective display area 820. FIGS. 11 and 12 illustrate examples in which the size of the virtual object 510 is less than the size of the effective display area 820 or angle-of-field area 800.

If it is determined that the virtual object 510 approached the edge of the effective display area 820, the wearable device 200 according to an embodiment of the disclosure may control the display module (e.g., the light output module 211) to display the virtual object 510 by adjusting the position thereof in operation 1130. The wearable device 200 according to an embodiment of the disclosure may change the position of the virtual object 810 such that the virtual object 810 (e.g., the center of the virtual object 810) is positioned at a substantive center of the effective display area 820. If the virtual object 510 (e.g., an edge of the virtual object 510) is position within a specified distance from the edge of the effective display area 820, the wearable device 200 according to an embodiment of the disclosure determine that the virtual object approached the edge of the effective display area 820.

If it is determined that the virtual object 510 have not approached the edge of the effective display area 820, the wearable device 200 according to an embodiment of the disclosure may control the display module (e.g., the light output module 211) to display the virtual object 510 at the current position in operation 1140.

In the case where the virtual object 510 is displayed only in a portion of the angle-of-field area 800, the wearable device 200 according to an embodiment of the disclosure may maintain the size of the effective display area 820. In other words, operation 1110 according to an embodiment of the disclosure may not be performed according to various embodiments of the disclosure. In this case, the wearable device 200 according to an embodiment of the disclosure may identify whether or not the virtual object 510 is displayed close to the edge of the effective display area 820. If the surrounding illuminance is increased and if the virtual object 510 is displayed close to the edge of the effective display area 820, the wearable device 200 according to an embodiment of the disclosure may control the display module (e.g., the light output module 211) to display the virtual object 510 to be adjusted in its position. For example, the wearable device 200 according to an embodiment of the disclosure may move the position of the virtual object 810 such that the virtual object 810 (e.g., the center of the virtual object 810) is positioned at a substantive center of the effective display area 820.

A wearable device 200 (e.g., the electronic device 101 in FIG. 1) according to an embodiment of the disclosure may include a display module (e.g., the light output module 211) and at least one processor (e.g., the processor 120), wherein the at least one processor may be configured to control the display module to output light having a first brightness value from at least one light source of the display module so as to display a virtual object 510 in an effective display area 820 having a first size, determine whether or not surrounding illuminance of the wearable device increases while the light having the first brightness value is output, change, based on determining that the surrounding illuminance increases, the size of the effective display area displaying the virtual object from the first size to a second size, and control the display module to display the virtual object in the effective display area having the second size.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
   display circuitry;
   memory storing one or more computer programs; and
   one or more processors communicatively coupled to the display circuitry and the memory,
   wherein the one or more computer programs include computer-executable instructions that, when executed by the one or more processors individually or collectively, cause the wearable device to:
   control the display circuitry to output light having a first brightness value from at least one light source of the display circuitry so as to display a virtual object in an effective display area having a first size,
   determine whether or not surrounding illuminance of the wearable device increases while the light having the first brightness value is output,
   based on determining that the surrounding illuminance increases, change a size of the effective display area displaying the virtual object from the first size to a second size by switching the at least one light source included in the display circuitry from an ON state to an OFF state, and
   control the display circuitry to display the virtual object in the effective display area having the second size.

2. The wearable device of claim 1, wherein the one or more computer programs further include computer-executable instructions that, when executed by the one or more processors individually or collectively, cause the wearable device to:
   based on determining that the surrounding illuminance increases, control the display circuitry such that brightness of the light output from the light source of the display circuitry is changed from the first brightness value to a second brightness value greater than the first brightness value.

3. The wearable device of claim 1, wherein the first size is greater than the second size.

4. The wearable device of claim 1,
   wherein the effective display area is included in an angle-of-field area configured for the wearable device, and
   wherein the one or more computer programs further include computer-executable instructions that, when executed by the one or more processors individually or collectively, cause the wearable device to control the display circuitry to display the remaining area of the angle-of-field area, excluding the effective display area having the second size, in a specified color.

5. The wearable device of claim 4, wherein the first size of the effective display area is substantially a same size as a size of the angle-of-field area.

6. The wearable device of claim 1, wherein a size of the virtual object is substantially a same size as the first size of the effective display area.

7. The wearable device of claim 1, further comprising:
   at least one sensor configured to sense first image data output from the display circuitry and second image data of the virtual object,
   wherein the one or more computer programs further include computer-executable instructions that, when executed by the one or more processors individually or collectively, cause the wearable device to:

compare the first image data with the second image data, and in case that the first image data and the second image data are substantially different from each other, control the display circuitry to display the virtual object in the effective display area having the changed second size.

8. The wearable device of claim 1, wherein the one or more computer programs further include computer-executable instructions that, when executed by the one or more processors individually or collectively, cause the wearable device to;

determine that the virtual object approaches an edge of the effective display area having the second size.

9. The wearable device claim 8, wherein the one or more computer programs further include computer-executable instructions that, when executed by the one or more processors individually or collectively, cause the wearable device to:

in case it is determined that the virtual object approaches the edge of the effective display area having the second size, move a display position of the virtual object within the effective display area having the second size.

10. A method performed by a wearable device, the method comprising:

controlling, by the wearable device, display circuitry of the wearable device to output light having a first brightness value from at least one light source of the display circuitry so as to display a virtual object in an effective display area having a first size;

determining, by the wearable device, that surrounding illuminance of the wearable device increases while the light having the first brightness value is output;

based on determining that the surrounding illuminance increases, changing, by the wearable device, a size of the effective display area displaying the virtual object from the first size to a second size by switching the at least one light source included in the display circuitry from an ON state to an OFF state; and controlling, by the wearable device, the display circuitry to display the virtual object in the effective display area having the second size.

11. The method of claim 10, further comprising:

based on determining that the surrounding illuminance increases, controlling the display circuitry such that brightness of the light output from the light source of the display circuitry is changed from the first brightness value to a second brightness value greater than the first brightness value.

12. The method of claim 10, wherein the first size is greater than the second size.

13. The method of claim 10, wherein the effective display area is included in an angle-of-field area configured for the wearable device, and wherein the method further comprises controlling the display circuitry to display the remaining area of the angle-of-field area, excluding the effective display area having the second size, in a specified color.

14. The method of claim 13, wherein the first size of the effective display area is substantially a same size as a size of the angle-of-field area.

15. The method of claim 10, wherein a size of the virtual object is substantially a same size as the first size of the effective display area.

16. The method of claim 10, wherein the wearable device further comprises at least one sensor configured to sense first image data output from the display circuitry and second image data of the virtual object, and wherein the method further comprises:

comparing, by the wearable device, the first image data with the second image data; and in case that the first image data and the second image data are substantially different from each other, controlling, by the wearable device, the display circuitry to display the virtual object in the effective display area having the second size.

17. The method of claim 10, further comprising:

determining, by the wearable device, that the virtual object approaches an edge of the effective display area having the second size.

18. The method of claim 17, further comprising:

in case it is determined that the virtual object approaches the edge of the effective display area having the second size, moving, by the wearable device, a display position of the virtual object within the effective display area having the second size.

* * * * *